United States Patent
Ren et al.

(10) Patent No.: US 8,887,495 B2
(45) Date of Patent: Nov. 18, 2014

(54) ASH FILTER, EXHAUST GAS TREATMENT SYSTEM INCORPORATING THE SAME AND METHOD OF USING THE SAME

(75) Inventors: Shouxian Ren, Ypsilanti, MI (US); David B. Brown, Brighton, MI (US); Michael Christopher Luckham, Highland, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 945 days.

(21) Appl. No.: 12/502,437

(22) Filed: Jul. 14, 2009

(65) Prior Publication Data

US 2011/0011067 A1 Jan. 20, 2011

(51) Int. Cl.
*F01N 3/02* (2006.01)
*F01N 3/00* (2006.01)
(Continued)

(52) U.S. Cl.
CPC .......... *F01N 3/2066* (2013.01); *B01D 53/9477* (2013.01); *F01N 13/009* (2014.06); *F01N 2450/30* (2013.01); *F01N 2370/24* (2013.01); *F01N 3/103* (2013.01); *F01N 2610/03* (2013.01); *F01N 3/021* (2013.01); *B01D 46/446* (2013.01); *F01N 3/0842* (2013.01); *B01D 46/0061* (2013.01); *Y02T 10/24* (2013.01); *F01N 13/0097* (2014.06); *B01D 2279/30* (2013.01); *B01D 46/0024* (2013.01); *B01D 2255/50* (2013.01); *F01N 3/0814* (2013.01); *F01N 3/106* (2013.01); *B01D 46/2418* (2013.01); *B01D 2258/012* (2013.01); *B01D 46/2455* (2013.01); *B01D 2255/915* (2013.01); *F01N 3/0222* (2013.01); *F01N 3/2828* (2013.01); *F01N 2610/1453* (2013.01); *F01N 2610/02* (2013.01); *B01D 2046/2437* (2013.01); *B01D 53/944* (2013.01); *F01N 13/16* (2013.01); *F01N 2240/20* (2013.01); *B01D 53/9418* (2013.01); *F01N 2370/04* (2013.01)
USPC .................... 60/311; 60/274; 60/297; 60/301

(58) Field of Classification Search
USPC .................................... 60/274, 297, 301, 311
See application file for complete search history.

(56) References Cited

U.S. PATENT DOCUMENTS 5,628,975 A * 5/1997 Horiuchi et al. ........... 423/213.2
6,928,809 B2 * 8/2005 Inoue et al. ..................... 60/297
(Continued)

FOREIGN PATENT DOCUMENTS

WO WO 2008/132452 * 11/2008

*Primary Examiner* — Binh Q Tran
*Assistant Examiner* — Diem Tran
(74) *Attorney, Agent, or Firm* — Cantor Colburn LLP

(57) ABSTRACT

An ash filter for a reciprocating piston internal combustion engine is disclosed. The ash filter includes a substrate, such as a honeycomb monolith substrate or a plurality of particulate substrates, and a matrix of a zeolite material disposed on the respective substrate or substrates, the matrix of the zeolite material configured to remove ash from an exhaust gas flow from a reciprocating piston internal combustion engine. An exhaust treatment system for a reciprocating piston internal combustion engine is disclosed. The exhaust treatment system includes an ash filter comprising a matrix of a first zeolite and configured to receive an exhaust gas flow from an engine; and an exhaust treatment device, the exhaust treatment device comprising a matrix of a second zeolite and configured to receive the exhaust gas flow from the ash filter.

18 Claims, 10 Drawing Sheets

(51) Int. Cl.
*F01N 3/10* (2006.01)
*B01D 53/94* (2006.01)
*F01N 13/00* (2010.01)
*F01N 3/021* (2006.01)
*B01D 46/44* (2006.01)
*F01N 3/08* (2006.01)
*B01D 46/00* (2006.01)
*B01D 46/24* (2006.01)
*F01N 3/022* (2006.01)
*F01N 3/28* (2006.01)
*F01N 13/16* (2010.01)
*F01N 3/20* (2006.01)

(56) References Cited

U.S. PATENT DOCUMENTS

| | | | |
|---|---|---|---|
| 7,332,454 B2 * | 2/2008 | Dang et al. | 502/60 |
| 7,434,387 B2 * | 10/2008 | Yan | 60/286 |
| 7,572,311 B2 * | 8/2009 | Zuberi | 55/523 |
| 7,607,291 B2 * | 10/2009 | Driscoll et al. | 60/286 |
| 7,950,226 B2 * | 5/2011 | McCarthy et al. | 60/301 |
| 8,096,125 B2 * | 1/2012 | Hepburn et al. | 60/605.2 |
| 2009/0107117 A1 * | 4/2009 | Chyo et al. | 60/286 |
| 2010/0290963 A1 * | 11/2010 | Andersen et al. | 423/213.2 |

* cited by examiner

| | Averaged FTP Conversions, %, Brench | | | |
|---|---|---|---|---|
| | NSR | $NO_x$ | HC | CO | Max $NH_3$, ppm |
| 700 cycles aged | 1.04 | 72.0 | 77.2 | 93.0 | 192 |
| | 1.3 | 78.4 | 77.6 | 93.6 | 351 |
| Ash accumulation aged | 1.04 | 39.8 | 71.9 | 92.1 | 280 |
| | 1.3 | 39.2 | 83.0 | 91.7 | 333 |

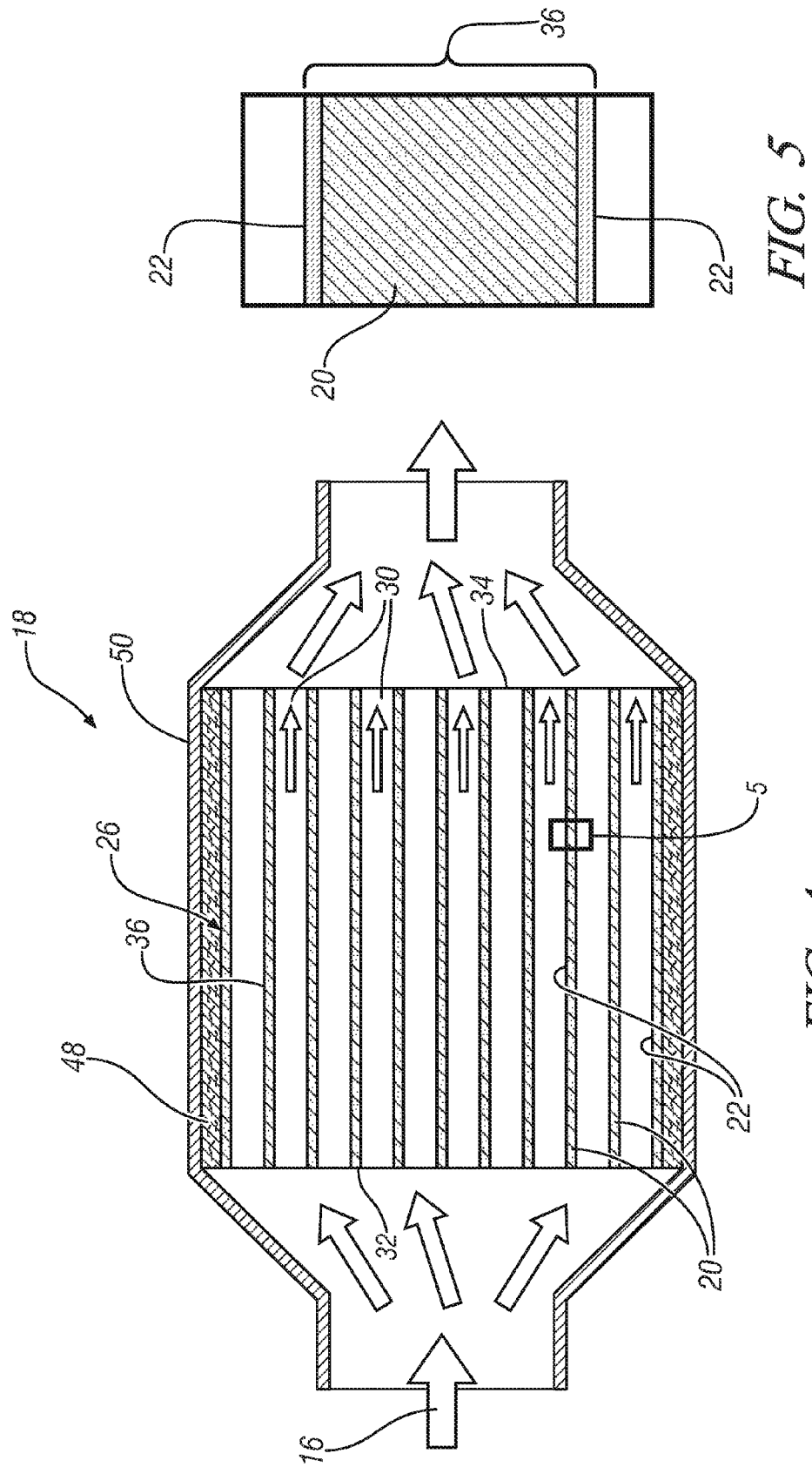

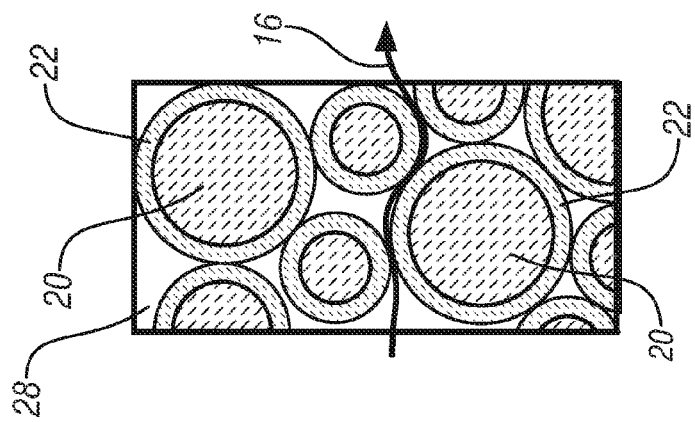
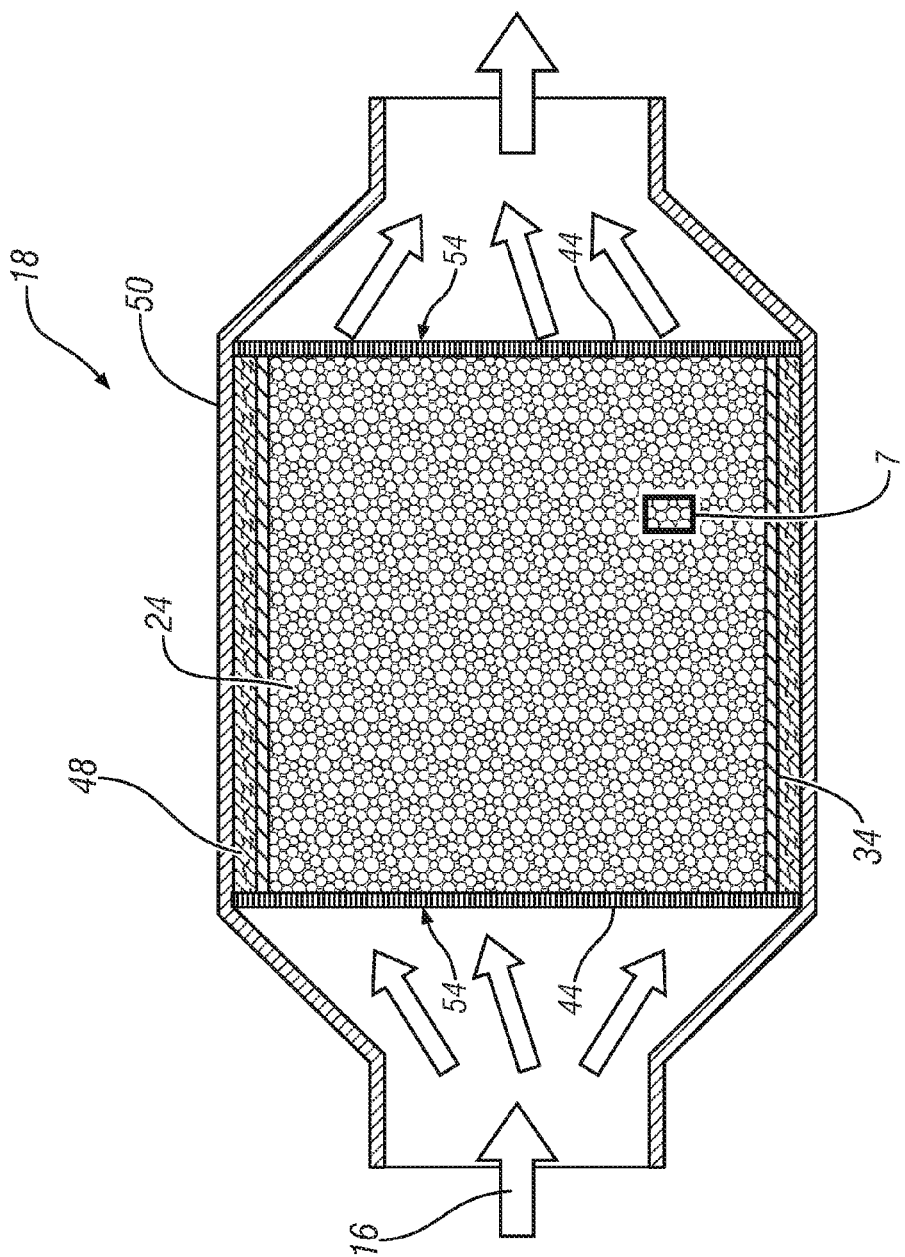
FIG. 7
FIG. 6

ASH FILTER, EXHAUST GAS TREATMENT SYSTEM INCORPORATING THE SAME AND METHOD OF USING THE SAME

FIELD OF THE INVENTION

Exemplary embodiments of the present invention are related to exhaust gas treatment systems, and, more specifically, to ash filters for use in exhaust gas treatment systems for use in reciprocating piston internal combustion engines and methods of using the same.

BACKGROUND

The exhaust gas emitted from an internal combustion engine, particularly a diesel engine, is a heterogeneous mixture that contains gaseous exhaust emissions such as carbon monoxide (CO), unburned hydrocarbons (HC) and oxides of nitrogen ($NO_X$) as well as condensed phase materials (liquids and solids) that constitute particulate matter (PM). Catalyst compositions typically disposed on catalyst supports or substrates are provided in a diesel engine exhaust system to convert certain, or all of these exhaust constituents into non-regulated exhaust gas components.

For example, reduction of $NO_X$ emissions from an exhaust feedstream containing excess oxygen is a challenge for vehicle manufacturers. By way of example, it is estimated that compliance with Bin 5 regulations in the United States may require an aftertreatment system capable of 70-90% $NO_X$ conversion efficiency on the FTP (Federal Test Procedure) cycle based on currently anticipated engine-out $NO_X$ levels. For practical application, the conversion efficiency must be obtained at a low temperature operating range (e.g., 200-350° C.) occurring during the aforementioned FTP cycle and at a higher temperature operating range (e.g., 450-550° C.) occurring during a high speed test cycle (e.g., US06 Federal Test Procedure).

The PM includes soot and other carbonaceous particulates that may be oxidized to produce gaseous CO or $CO_2$, as well as other non-combustible particulates (i.e., ash) that are not capable of being oxidized or otherwise treated to convert them to gaseous constituents for removal from the system. The composition and morphology of PM resulting from combustion in reciprocating piston internal combustion engines is a function of the fuel, engine type, engine design, engine operation and control methodology, environmental operating conditions and other factors. For example, engine lubricating oil that passes into the combustion chamber and is partially burned produces the majority of ash. As a further example, combustion in gasoline engines may produce submicron organic matter (OM), as well as sulfates and elemental silicon, iron, or zinc or sulfur. The elemental silicon, iron and zinc are non-combustible particulates and comprise ash. As another example, combustion in diesel engines may also produce OM, sulfates and elemental silicon, iron, zinc or sulfur, as well as soot and ammonium, and may produce about 100 to about 1000 times more PM than combustion in gasoline engines. The soot may include BC (black carbon, or condensed carbon particles) and OM. The BC may be coated with a single layer or multiple layers of OM, including polycyclic aromatic hydrocarbon (PAH), as well as a layer or layers of organic or inorganic compounds. Combustion of diesel fuel may also produce nitro-PAH compounds, i.e., PAH having nitrogen functional groups. Soot from reciprocating piston internal combustion engines may have a particle size less than about 0.02 µm in diameter.

Various particulate filters (PF) for combustible particles have been employed, such as Diesel Particulate Filter devices (DPF). There are several known filter structures used in DPF's that have displayed effectiveness in removing the particulate matter from the exhaust gas such as ceramic honeycomb wall-flow filters, wound or packed fiber filters, open cell foams, sintered metal fibers, etc. Ceramic wall-flow filters have experienced significant acceptance in automotive applications.

The filter is a physical structure for removing particulates from exhaust gas and, as a result, the accumulation of filtered particulates will have the effect of increasing the exhaust system backpressure experienced by the engine. To address backpressure increases caused by the accumulation of combustible exhaust gas particulates, the DPF is periodically cleaned, or regenerated. Regeneration of a DPF in vehicle applications is typically automated and is controlled by an engine or other controller based on signals generated by engine and exhaust system sensors. The regeneration event involves increasing the temperature of the DPF to levels that are often above 600° C. in order to burn the accumulated particulates.

One method of generating the temperatures required in the exhaust system for regeneration of the DPF is to deliver unburned HC to an oxidation catalyst device disposed upstream of the DPF. The HC may be delivered by injecting fuel directly into the exhaust gas system or may be achieved by late injection of fuel into the engine combustion chamber resulting in partially vaporized HC exiting the engine in the exhaust gas. The HC is oxidized in the oxidation catalyst device resulting in an exothermic reaction that raises the temperature of the exhaust gas. The heated exhaust gas travels downstream to the DPF and burns the particulate accumulation. A disadvantage to this method of regeneration is that the delivery of unburned HC to the engine exhaust system reduces the efficiency of the engine/vehicle since the fuel is not being used to do useful work. Additionally, depending upon the delivery location of the HC, heat loss to the engine and the exhaust system, upstream of the DPF can be significant; further reducing the system efficiency. Also, in instances where fuel is delivered by over-fueling the engine, some fuel may bypass the pistons resulting in undesirable fuel dilution of the engine oil.

The regeneration of the DPF also is known to negatively effect SCR devices that are exposed to the regeneration temperatures by diminishing the catalytic effectiveness of SCR catalysts that are exposed to these temperatures. Thus, over time, as the number of thermal regeneration cycles increases, the conversion efficiency of the SCR diminishes. This reduction in SCR conversion efficiency over time makes it more difficult to achieve the high conversion efficiencies described above.

Thus, while various methods and apparatuses have been developed to pyrolize the combustible particulates, such as carbonaceous particulates, the regeneration process may have a negative effect on the exhaust treatment system performance. In addition, the treatment of non-combustible particulates, referred to herein generally as ash, has not been effectively addressed.

Accordingly, it is desirable to provide an effective apparatus and method for treatment of ash in exhaust gas treatment systems of reciprocating piston internal combustion engines while also maintaining the required system conversion efficiency levels for the various regulated exhaust constituents.

SUMMARY OF THE INVENTION

In one exemplary embodiment of the present invention, an ash filter for a reciprocating piston internal combustion engine is provided. The ash filter includes a substrate and a matrix of a zeolite material disposed on the substrate, the matrix of the zeolite material configured to remove ash from an exhaust gas flow from a reciprocating piston internal combustion engine.

In another exemplary embodiment of the present invention, an exhaust treatment system for a reciprocating piston internal combustion engine is provided. The exhaust treatment system includes an upstream ash filter comprising a matrix of a first zeolite and configured to receive an exhaust gas flow from an engine; and an exhaust treatment device, the exhaust treatment device comprising a matrix of a second zeolite and configured to receive the exhaust gas flow from the ash filter.

In yet another exemplary embodiment of the present invention, a method of treating an exhaust gas flow from a reciprocating piston internal combustion engine, is provided. The method includes providing an exhaust treatment system comprising an ash filter comprising a matrix of a first zeolite and configured to receive an exhaust gas flow from an engine; and an exhaust treatment device, the exhaust treatment device comprising a matrix of a second zeolite and configured to receive the exhaust gas flow from the ash filter. The method also includes operating the engine to produce the exhaust gas flow containing an amount of ash. The method also includes filtering the exhaust gas flow using the ash filter to reduce the amount of ash in the exhaust gas flow.

The above features and advantages and other features and advantages of the present invention are readily apparent from the following detailed description of the best modes for carrying out the invention when taken in connection with the accompanying drawings.

BRIEF DESCRIPTION OF THE DRAWINGS

Other objects, features, advantages and details appear, by way of example only, in the following detailed description of embodiments, the detailed description referring to the drawings in which:

FIG. 4 is an exemplary embodiment of a discrete ash filter as disclosed herein;

FIG. 5 is an enlarged cross-sectional view of region 5 of FIG. 4;

FIG. 6 is a schematic cross-sectional view of second exemplary embodiment of a discrete ash filter as disclosed herein;

FIG. 7 is an enlarged cross-sectional view of region 7 of FIG. 6;

DESCRIPTION OF THE EMBODIMENTS

Figures 1, 2:
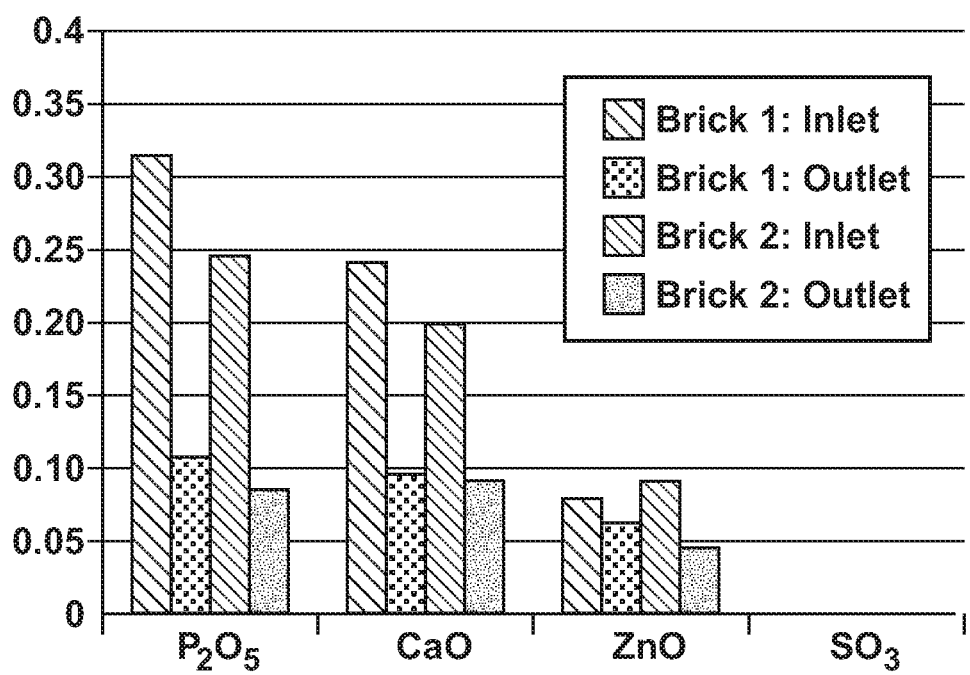
FIG. 1 is a table containing thermal aging data illustrating the effect of ash contamination on a catalytic exhaust treatment device.
FIG. 2 is a chart of the amount of several chemical compounds associated with ash accumulation as a function of location for representative catalyst test bricks used in a test described in FIG. 1.

In addition to the progressive reduction in effectiveness of SCR catalyst structures that may occur upon thermal cycling associated with regeneration of these filters and the associated combustion of the combustible PM, as described above, Applicants have discovered that non-combustible particulates (ash) also may accumulate on the catalytic surfaces of SCR catalyst structures, thereby further reducing their capacity to catalyze the oxidation or reduction of the various constituents of an exhaust gas flow passing through them, such as $NO_X$, CO, HC and the like, as well as the $NH_3$-out levels resulting from these conversions. As shown in FIG. 1, the conversion percentages achieved for various exhaust gas constituents pursuant to the FTP after aging an exhaust system containing an SCR catalyst for 700 DPF regeneration cycles with diesel engine exhaust gases flowing at a temperature of about 650° C. FIG. 1 also illustrates the effect of ash contamination on an identical exhaust system (with Urea SCR catalyst) that was aged for 420 cycles using a 4-mode ash aging cycle in a temperature range of 240-540° C. with diesel engine exhaust flowing through the system. The results show a significant reduction in the $NO_X$ conversion capability for these systems that is attributable to the accumulation of ash in the system. As shown in FIG. 2, subsequent chemical analysis of the SCR catalyst bricks revealed the presence of contaminants on the catalytic surface of the bricks that caused the reduction in $NO_X$ conversion efficiency, including $P_2O_5$, CaO and ZnO. The catalytic surfaces at the inlet ends of the brick had the highest levels of these contaminants, with the amounts of $P_2O_5$ and CaO being significantly higher at the inlet ends of the bricks. In addition to reduction in the conversion efficiency of the exhaust system, the accumulation of these constituents may also reduce the efficiency of the engine, since the reduced capacity of the catalytic devices may require the use of more oxidant or reductant materials over time, such as fuel, urea and the like, than would otherwise be required. For exhaust systems that also include a PF, these results also indicate that the accumulation of non-combustible particulates in PF structures, such as a DPF, may also tend to further increase the exhaust system backpressure. This increase in backpressure may not be completely relieved by regeneration of the filter as described above, due to the non-combustible nature of the particles. As such, these particles may also tend to progressively reduce the effectiveness of particulate filters used in exhaust treatment systems, particularly wall-flow particulate filters.

The following description is merely exemplary in nature and is not intended to limit the present disclosure, application or uses. It should be understood that throughout the drawings, corresponding reference numerals indicate like or corresponding parts and features.

Figure 3:
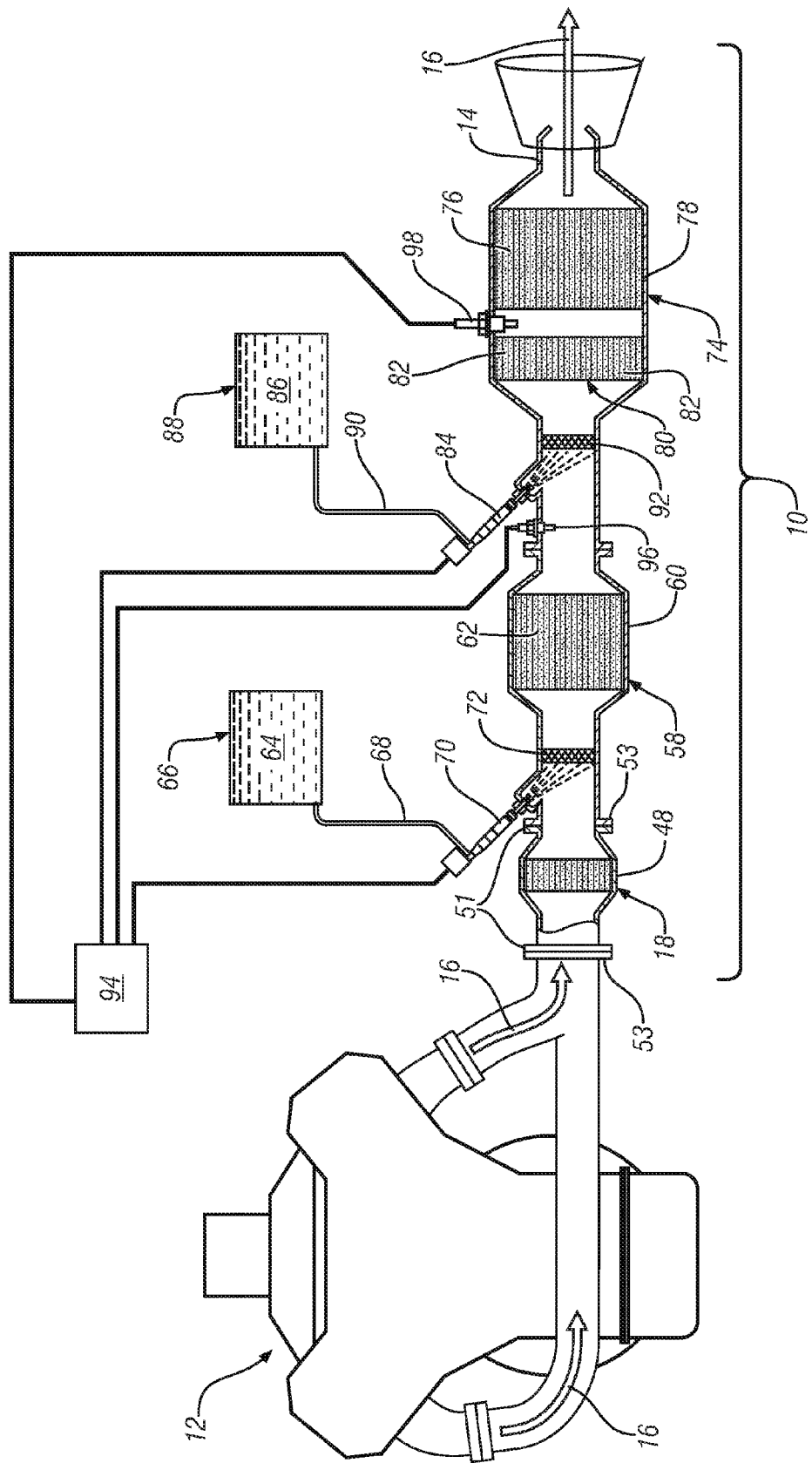
FIG. 3 is a schematic partial cross-sectional view of an exemplary embodiment of an exhaust gas treatment system as disclosed herein.

Referring now to FIG. 3, an exemplary embodiment of the invention is directed to an exhaust gas treatment system 10 for the treatment of regulated exhaust gas constituents of an internal combustion engine, such as a diesel engine 12. It will be appreciated that diesel engine 12 is merely exemplary in nature and that the invention described herein encompasses any type of reciprocating piston internal combustion engine having an exhaust treatment system 10 that includes an exhaust ash filter. This includes, but is not limited to, exhaust gas treatment systems for gasoline direct injection engines and homogeneous charge compression ignition engines. For ease of description and discussion, the disclosure will be discussed in the context of a diesel engine 12 and its exhaust treatment devices. Exhaust gas treatment system 10 includes an exhaust gas conduit 14, which may comprise several discrete segments that function to transport an exhaust gas flow 16 that includes various combustible and non-combustible PM, including ash, from the diesel engine 12 to the various exhaust treatment devices of the exhaust gas treatment system 10. In an exemplary embodiment, exhaust gas treatment system 10 includes at least one ash filter 18, and in other exemplary embodiments may also include a plurality of ash filters 18. Ash filter 18 will be employed to filter and accumulate ash from the exhaust gas flow 16 and prevent its emission to the external environment.

In other exemplary embodiments, exhaust gas treatment system 10 will include at least one additional exhaust treatment device. Any additional exhaust treatment device may be utilized together with ash filter 18. Examples of suitable additional exhaust treatment devices include a various oxidation catalysts (OC), selective catalyst reduction (SCR) catalysts or particulate filters (PF), or a combination thereof. Any suitable OC may be used depending generally on the fuel used to power the engine, and may include all manner of gasoline oxidation catalysts (GOC) and diesel oxidation catalysts (DOC). Any suitable SCR may be used depending generally on the fuel used to power the engine, the constituents of the exhaust gas flow 16, the desired control limits of these constituents and other factors related to the control of the emissions from system 10, and may include all manner of hydrocarbon SCR (HC-SCR) catalysts, lean $NO_X$ traps (LNT), NSR catalysts or urea SCR catalysts (U-SCR), or a combination thereof. Any suitable PF may be used depending generally on the fuel used to power the engine, including all manner of gasoline particulate filters (GPF) and diesel particulate filters (DPF). Additional exhaust treatment devices particularly include all multiple catalyst configurations, including various two-way catalyst, three-way catalyst, four-way catalyst configurations and the like, and further including those configurations that also incorporate a PF, such as a DPF and sometimes include the PF in the catalyst count, e.g., a two-way catalyst that includes an HC-SCR or lean $NO_X$ catalyst (LNC), U-SCR, NSR or LNT and a DPF. In this embodiment ash filter 18 will be employed with at least one additional exhaust treatment device to filter and accumulate ash from exhaust gas flow 16 upstream of the device. In this configuration, ash filter 18 will slow or prevent the reduction of the catalytic conversion capacity or filtration capacity or capability of the additional exhaust treatment device due to the accumulation of ash that would otherwise progressively occur in conjunction with the operation of engine 12 if ash filter 18 were not included in system 10.

Referring to FIGS. 3-7, exemplary embodiments of a discrete ash filter 18, i.e., that exists and is housed separately from other exhaust treatment devices, are shown in conjunction with an exemplary exhaust gas treatment system 10. The use in conjunction with system 10, particularly the nature and arrangement of the other exhaust treatment devices, is merely exemplary to illustrate the use of ash filter 18. A discrete ash filter 18, including the exemplary embodiments shown, may be used with any other useful combination of additional exhaust treatment devices. In other exemplary embodiments, ash filter 18 may also be integrated with additional exhaust treatment devices as an integrated ash filter 18, as described herein and illustrated in FIGS. 8-10 or incorporated onto an additional exhaust treatment device as an integral ash filter 18 as described herein and illustrated in FIGS. 11-13.

Referring again to FIGS. 3-7, ash filter 18 includes a substrate 20 having a porous matrix material 22, such as a porous matrix of a zeolite material, disposed thereon as a medium for ash filtration and accumulation. The porous matrix material 22 does not include a catalyst material, as it operates sacrificially to accumulate ash and thereby prevent the ash from accumulating elsewhere in the system, particularly from accumulation on the catalyst materials of various catalytic devices or in the filtration media of various other filters, as described herein. The substrate 20 may be formed from any of those materials typically used as substrates for catalyst materials, and will preferably comprise a ceramic or metallic substrate 20. Suitable substrates 20 include various high temperature ceramics and high temperature metals or metal alloys. A ceramic substrate 20 may be made of any suitable refractory material; examples include cordierite, cordierite-alumina, silicon nitride, zircon mullite, spodumene, alumina-silica magnesia, zircon silicate, sillimanite, a magnesium silicate, zircon, petalite, alumina, an aluminosilicate and the like. Metallic substrates may include oxidation and heat resistant metals and metal alloys; examples include Ti, Ti alloys and various grades of stainless steel, as well as other alloys in which iron is a substantial or major component, including other alloys that contain one or more of nickel, chromium or aluminum, or a combination thereof, and the total amount of these metals may advantageously comprise at least about 15 wt. % of the alloy, e.g., 10-25 wt. % of chromium, 3-8 wt. % of aluminum and up to 20 wt. % of nickel. The alloys may also contain small or trace amounts of one or more other metals such as manganese, copper, vanadium, titanium and the like. The surfaces of the metal substrates may be oxidized at high temperatures, e.g., 1000° C. and higher, to improve the resistance to corrosion and further oxidation of the alloys by forming an adherent surface oxide layer. Such high temperature oxidation may also enhance the adherence of the porous matrix material 22 to the substrate 20.

Any suitable substrate 20 shape and size may be may be employed for ash filter 18. Particularly useful shapes for ceramic substrate 20 include a plurality or bed 24 of ceramic or metal particles, as illustrated in a discrete ash filter 18 in FIGS. 6 and 7 and an integral ash filter 18 in FIG. 10, honeycomb-like ceramic or metal flow-through monolith 26 structures, as illustrated in a discrete ash filter 18 in FIGS. 4 and 5 and an integral ash filter 18 in FIGS. 8-11, and honeycomb-like wall-flow ceramic monolith 28 structures, as illustrated in an integral ash filter in FIG. 13.

As shown in FIGS. 4, 5, 9 and 11, honeycomb-like ceramic or metal flow-through monolith 26 substrates 20 include those having a plurality of fine, parallel gas flow passages 30 extending therethrough from an inlet 32 to an outlet 34 face of the substrate 20, such that passages 30 are open to passage of exhaust gas flow 16 therethrough and are referred to as honeycomb flow-through substrates. For these monoliths, the passages, which are essentially straight paths from the inlet 32 to the outlet 34, are defined by a plurality of interconnected adjoining side walls 36 on which porous matrix material 22, such as a matrix of a zeolite material, is disposed, either as a layer on the surface of the substrate 20 or within the porous substrate 20, generally as a washcoat. The washcoat may include a single layer or a plurality of layers, and may have any suitable thickness, surface area, density or other characteristic necessary to provide the desired filter capacity or filtration capability. The porous matrix material 22 may include any porous network, including highly ordered porous structures having an ordered array of pores as well as all manner of disordered porous structures, which is configured to capture ash particles within exhaust gas flow 16. Porous matrix materials 22 that include various zeolite materials are preferred due to their porous ordered structures.

Figure 12:
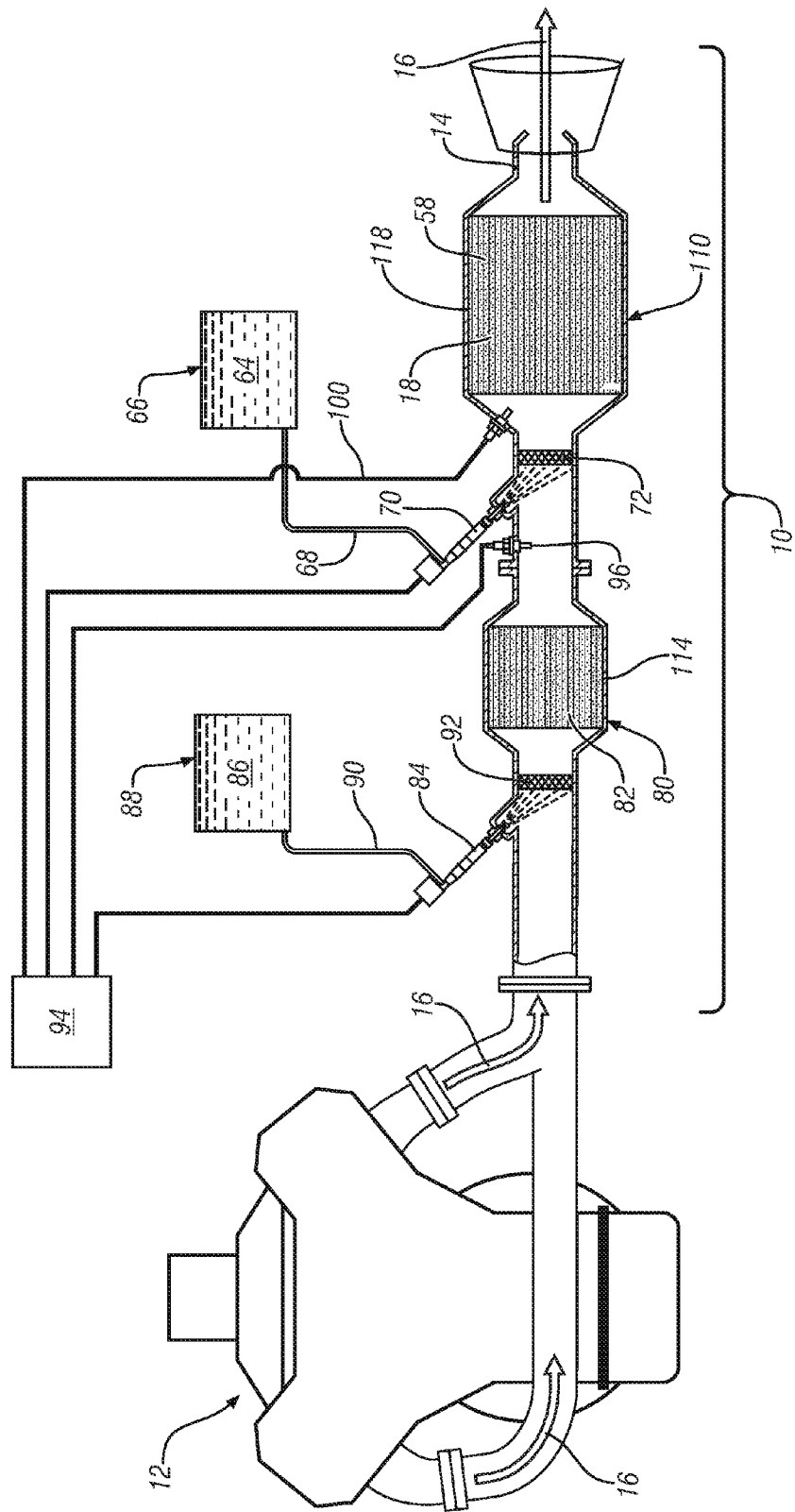
FIG. 12 is a schematic partial cross-sectional view of a third exemplary embodiment of an exhaust gas treatment system as disclosed herein.
Figure 13:
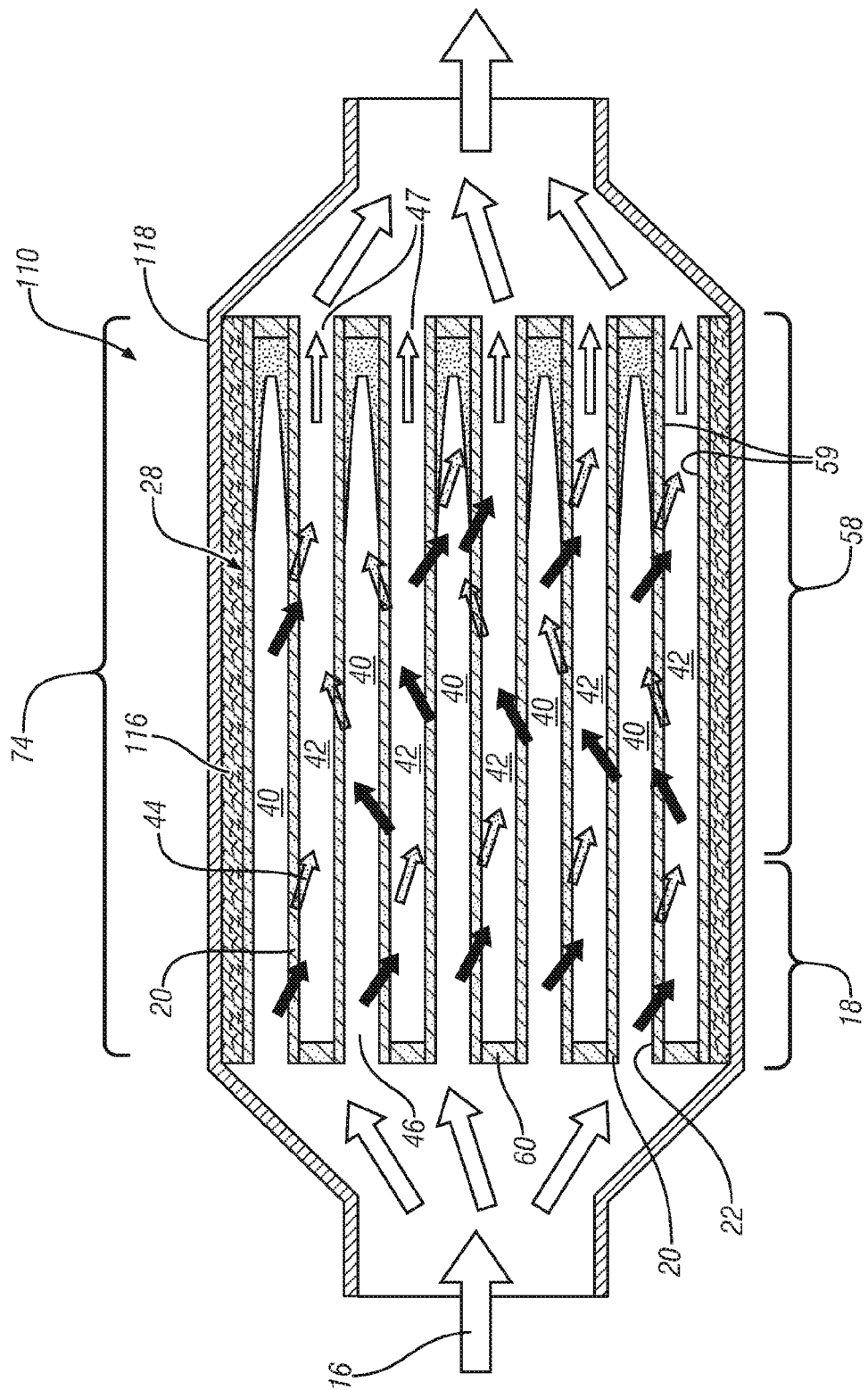
FIG. 13 is a schematic illustration of a fourth exemplary embodiment of an ash filter and exhaust treatment device.

As shown in FIGS. 12 and 13, honeycomb-like ceramic wall-flow monolith substrates 20 include those having a plurality of fine, parallel, complementary inlet passages 40 and outlet passages 42 that are fluidly coupled by adjoining, porous, exhaust permeable sidewalls 44 that fluidly connect adjoining inlet passages 40 and outlet passages 42. Inlet passages 40, permeable sidewalls 44 and outlet passages 42 are configured to communicate exhaust gas flow 16 from an inlet 46 to an outlet 47 of the substrate 20 and are thus referred to as honeycomb wall-flow substrates. For these monoliths, the passages provide tortuous paths from the inlet 46 via inlet passages 40 to the outlet 47 through the outlet passages 42 via the network of passages provided through porous sidewalls 44. The inlet passages 40 and outlet passages 42 are defined by the plurality of interconnected adjoining side walls 44 on which porous matrix material 22, such as a matrix of a zeolite material, is disposed, preferably in the inlet passages 40 proximate the inlet 46.

Referring to FIGS. 4, 5, 9, 11 and 13, the flow passages of the flow-through and wall-flow monolithic substrate 20 are thin-walled channels, which can be of any suitable cross-sectional shape and size such as trapezoidal, rectangular, square, sinusoidal, hexagonal, oval, circular or the like. Such structures may contain from about 60 to about 600 or more gas inlet openings (i.e., cells) per square inch of cross section. The substrates 20 useful for the catalysts of the present invention may also be metallic in nature and include one or more metals or metal alloys. The metallic substrates may be employed in various shapes such as corrugated sheet, or monolithic form, particularly flow-through monoliths, as described above.

Regardless of the shape of substrate 20, porous matrix material 22, such as a matrix of a zeolite material, may be disposed either as a layer on the surface of the substrate 20 or within the porous sidewalls of substrate 20, generally as a washcoat. The washcoat may include a single layer or a plurality of layers, and may have any suitable thickness, surface area, density or other characteristic necessary to provide the desired filter capacity or filtration capability. The porous matrix material 22 may include any porous network, including highly ordered porous structures having an ordered array of pores as well as all manner of disordered porous structures, which is configured to capture ash particles within exhaust gas flow 16. Porous matrix materials 22 that include various zeolite materials are preferred due to their highly porous and highly ordered zeolite structures. A zeolite matrix material 22 may be applied as a washcoat. The zeolite matrix material 22 may include any suitable zeolite matrix material 22. One suitable zeolite matrix material 22 includes an alumina zeolite. The alumina zeolite material 22 may also include silica, such as various alumina silica compounds, including various aluminosilicate materials. Further, the alumina zeolite matrix material may also include Zr, Nb, Y, Hf, La, Ce or Nd, or an oxide of them, or an alloy of them, or a combination thereof. The alumina zeolite matrix material may include a plurality of surface hydroxylated alumina particles. The surface hydroxylated alumina particles may include boehmite, pseudo-boehmite, gelatinous boehmite, diaspore, nordstrandite, bayerite or gibbsite, or a combination thereof. The alumina zeolite matrix material may include NaX, NaY or ZSM-5 zeolites, or a combination thereof. The zeolite matrix material may have any pore size or morphology suitable to capture ash particles from exhaust gas flow 16. In an exemplary embodiment, the average pore size is greater than about 1 nm. The zeolite matrix material 22 may be disposed on the surface of or within a substrate 20. Disposition within a substrate 20 may be provided, for example, where the substrate 20 is a porous material such that the zeolite matrix may be disposed within the porous material of the substrate 20. When a washcoat is employed, any suitable thickness or number of layers of the washcoat may be used. In an exemplary embodiment, a washcoat, whether as a single layer or as a plurality of layers, may have a density of about 1.0 to about 3.0 g/in$^3$.

Referring to FIGS. 3-13, exhaust gas flow 16 is directed within ash filter 18 over the substrate 20 and porous matrix material 22 disposed thereon, such as matrix of zeolite material, so that the gases flowing through the passages contact the porous matrix material and the ash contained in flow 16 is filtered by the porous matrix, such that it is removed from the flow 16 and accumulates in the porous matrix material 22. By reducing the amount of ash in exhaust gas flow 16, the amount of ash emissions from system 10 are reduced. Further, the amount of ash flowing over a downstream exhaust treatment device (or devices) is reduced, thereby reducing the potential for accumulation of ash on the catalytic surfaces or filtration media of these devices, and consequent reduction in their performance, e.g., reduced oxidation capacity (for OC), $NO_X$ conversion capacity (for U-SCR, HC-SCR, LNC, LNT or NSR), reduced filtration capacity due to non-combustible ash accumulation (for PF). Stated positively, the incorporation of ash filter 18 tends to improve the operating performance and extend the operating lifetime of exhaust treatment system 10.

Referring to FIGS. 3-7, an exemplary embodiment of the system 10 includes an exhaust treatment device in the form of discrete ash filter 18. As shown in FIGS. 4 and 5, ash filter 18 may include a flow-through metal or ceramic monolith 26 substrate 20 having a porous matrix material 22, such as a zeolite matrix material, disposed thereon as described herein. Monolith 26 is wrapped in an intumescent mat 48 that expands when heated, thereby securing and insulating the substrate 20 which is packaged in a metal shell or canister 50, such as a stainless steel shell, having an inlet and outlet in fluid communication with exhaust gas conduit 14. Metal shell 50 may include a pair of flanges 51 or similar attachment features that provide for the removable attachment of ash filter 18 to system 10, including conduit 14 by using suitable attachment device (not shown), such as a plurality of threaded bolts (and a corresponding plurality of circumferentially spaced bores located on flange 51), circumferential band clamps and the like. Attachment devices can be used to attach flanges 51 to mating attachment features, such as flanges 53 that may be associated with sections of conduit 14 or other exhaust treatment devices. This is an advantageous aspect of discrete ash filter 18 because it allows the removal and replacement of ash filter 18 during the service life of exhaust treatment system 10 and diesel engine 12. Thus, discrete ash filter 18 that has accumulated ash in conjunction with operation of diesel engine 12 and exhaust treatment system 10 can be removed and replaced with a new discrete ash filter 18, thereby facilitating maintenance of both diesel engine 12 and exhaust treatment system 10. Removal and replacement may be performed according to a predetermined time interval, or based on monitoring of exhaust treatment system 10 using various sensors in conjunction with a system controller, as described herein.

Another exemplary embodiment of ash filter 18 and substrate 20 includes a plurality or bed 24 of substrate 20 particles having the zeolite matrix material 22 disposed on the surface of or within the substrate 20 particles, as illustrated in FIGS. 6 and 7. Ash filter 18 may be housed in a metal shell or canister 50, such as a stainless steel shell, having an inlet and outlet in fluid communication with the exhaust gas conduit 14. Discrete ash filter 18 may also be configured for removable attachment to exhaust treatment system 10 as described above in conjunction with the ash filter illustrated in FIGS. 4 and 5. In an exemplary embodiment, the bed 24 of substrate 20 particles may be housed in bed housing or can 52 that may be made from the same materials as outer housing 50. The bed 24 may be enclosed within bed housing 52 by a pair of attached end caps 54 that include a plurality of perforations 44 or holes that enable exhaust gas flow 16 to pass through them to bed 24 and over the surface of porous matrix material 22 for filtration of ash as described herein, and which also may be made from the same materials as housing 50.

Referring again to FIG. 3, exhaust treatment system 10 also includes a Selective Catalytic Reduction device (SCR) 58 disposed downstream of the ash filter 18. The SCR catalyst 58 may also include a flow-through ceramic or metal monolith substrate 60 that is wrapped in an intumescent mat (not shown) that expands when heated, securing and insulating the substrate which is packaged in metal shell or canister 62, such as stainless steel shell, having an inlet and an outlet in fluid communication with exhaust gas conduit 14. The substrate has an SCR catalyst material (not shown) applied thereto. The SCR catalyst composition preferably includes a zeolite matrix material with one or more base metal catalyst materials disposed thereon, such as iron (Fe), cobalt (Co), copper (Cu) or vanadium (V), or an oxide of them, or an alloy of them, or a combination thereof, which can operate efficiently to convert $NO_X$ constituents in the exhaust gas flow 16 in the presence of a suitable reductant, such as ammonia ($NH_3$). The $NH_3$ reductant 64, supplied from reductant supply tank 66 through conduit 68, may be injected into the exhaust gas conduit 14 at a location upstream of the SCR catalyst 58 using a urea injector 70 in fluid communication with conduit 68, or other suitable method of delivery of the reductant to the exhaust gas flow 16. The reductant may be in the form of a gas, a liquid, including an aqueous urea solution and may be mixed with air in the injector 70 to aid in the dispersion of the injected spray. A mixer or turbulator 72 may also be disposed within the exhaust gas conduit 14 in close proximity to the injector 70 to further assist in thorough mixing of the reductant 64 with the exhaust gas flow 16.

Referring again to FIG. 3, exhaust treatment system 10 also includes exhaust gas PF in the form of DPF 74 is located downstream of SCR catalyst 58, DPF 74 operates to filter the exhaust gas flow 16 of PM, including soot and other OM particulates. DPF 74 may be constructed using a ceramic wall-flow monolith 76 to filter these materials from exhaust gas flow 16. DPF may be wrapped in an intumescent mat (not shown) that expands when heated, securing and insulating the filter which is packaged in a metal shell or canister 78, such as a stainless steel shell, having an inlet and an outlet in fluid communication with exhaust gas conduit 14. As described herein with reference to ash filter 18, the ceramic wall-flow monolith 76 has a plurality of permeable longitudinally extending passages that are defined by longitudinally extending walls. The passages include a subset of inlet passages that have an open inlet end and a closed outlet end, and a complementary subset of outlet passages that have a closed inlet end and an open outlet end. Exhaust gas flow 16 entering the DPF 74 through the inlet ends of the inlet passages is forced to migrate through adjacent longitudinally extending walls to the outlet passages. It is through this wall flow mechanism that the exhaust gas flow 16 is filtered of soot and other OM particulates. The filtered particulates are deposited on the longitudinally extending walls of the inlet passages and, over time, will have the effect of increasing the exhaust gas backpressure experienced by diesel engine. It is appreciated that the ceramic wall-flow monolith filter is merely exemplary in nature and that the DPF may include other filter devices such as wound or packed fiber filters, open cell foams, sintered metal fibers, etc.

In an exemplary embodiment, the increase in exhaust backpressure caused by the accumulation of soot and other OC particulate matter requires that the DPF 74 is periodically cleaned, or regenerated. Regeneration involves the oxidation or burning of the accumulated carbon and other particulates in what is typically a high temperature (e.g., >600° C.) environment.

Optionally, a Diesel Oxidation Catalyst device (DOC) 80 may also be disposed within canister 78 of the DPF 74. DOC 80 may include a flow-through metal or ceramic monolith substrate 82 that is wrapped in an intumescent mat (not shown) that expands when heated, securing and insulating the substrate in the metal shell or canister 78. The substrate 82 has an oxidation catalyst compound (not shown) disposed thereon. The oxidation catalyst compound may be applied as a washcoat and may contain a Pt group metal catalyst material. Suitable Pt group metal catalysts include Pt, Rh, Ir, Ru, Re, Os or Pd, or alloys of them, or combinations thereof.

Referring again to FIG. 3, disposed upstream of the DOC 80, in fluid communication with the exhaust gas flow 16 in the exhaust gas conduit 14, is an HC or fuel injector 84. The fuel injector 84, is in fluid communication with HC 86, such as fuel, in fuel supply tank 88 or other fuel source, such as a fuel conduit of a common rail fuel injection system (not shown), through fuel conduit 90. Fuel injector 84 is configured to introduce unburned HC 86 into the exhaust gas flow 16 for delivery to DOC 80. A mixer or turbulator 92 may also be disposed within the exhaust gas conduit 14, in close proximity to the fuel injector 84, to further assist in thorough mixing of the liquid or gaseous HC or fuel with the exhaust gas flow 16.

Referring again to FIG. 3, a controller such as vehicle controller 94 is operably connected to, and monitors and controls, the exhaust gas treatment system 10 through signal communication with urea injector 70, fuel injector 84 and a number of temperature, pressure and exhaust gas sensors, such as $NO_X$ sensors, oxygen sensors and the like. As used herein, the term controller may include any suitable controller, such as an application specific integrated circuit (ASIC), an electronic circuit, a processor (shared, dedicated or group) and memory that executes one or more software or firmware programs, a combinational logic circuit, and/or other suitable components that provide the described control functionality.

In an exemplary embodiment, a pressure sensor 96, located upstream of DPF 74, generates a signal indicative of the carbon and particulate loading in the ceramic wall-flow monolith filter 76 and the backpressure within system 10. Upon a determination that the backpressure has reached a predetermined level indicative of the need to regenerate the DPF 74, the controller 94 activates HC or fuel injector 84 to deliver fuel into the exhaust gas conduit 14 for mixing with the exhaust gas flow 16. The fuel/exhaust gas mixture enters the DPF 74, and also flows through DOC 80 if used, inducing oxidation of the HC in the exhaust gas flow 16 and raising the exhaust gas temperature to a level (>600° C.) suitable for regeneration of the soot and other OM particulates in the ceramic wall flow monolith filter 76. The controller 94 may monitor the temperature of the exothermic oxidation reaction in the DPF 74 and DOC 80 and the ceramic wall flow monolith filter 76 through temperature sensor 98 and adjust the delivery rate of injector 84 to maintain a predetermined temperature. A $NO_X$ sensor (not shown) may be inserted into conduit 14 to generate a signal indicative of the amount of engine-out $NO_X$ and controller 94 may use this signal to control urea injector 70 for the injection of urea into SCR catalyst 58 for the reduction of $NO_X$ to maintain a predetermined level of $NO_X$ in exhaust gas flow 16. Many other control methodologies are possible in conjunction with system 10 to control the $NO_X$, HC, CO and PM associated with exhaust gas flow 16.

Figure 8:
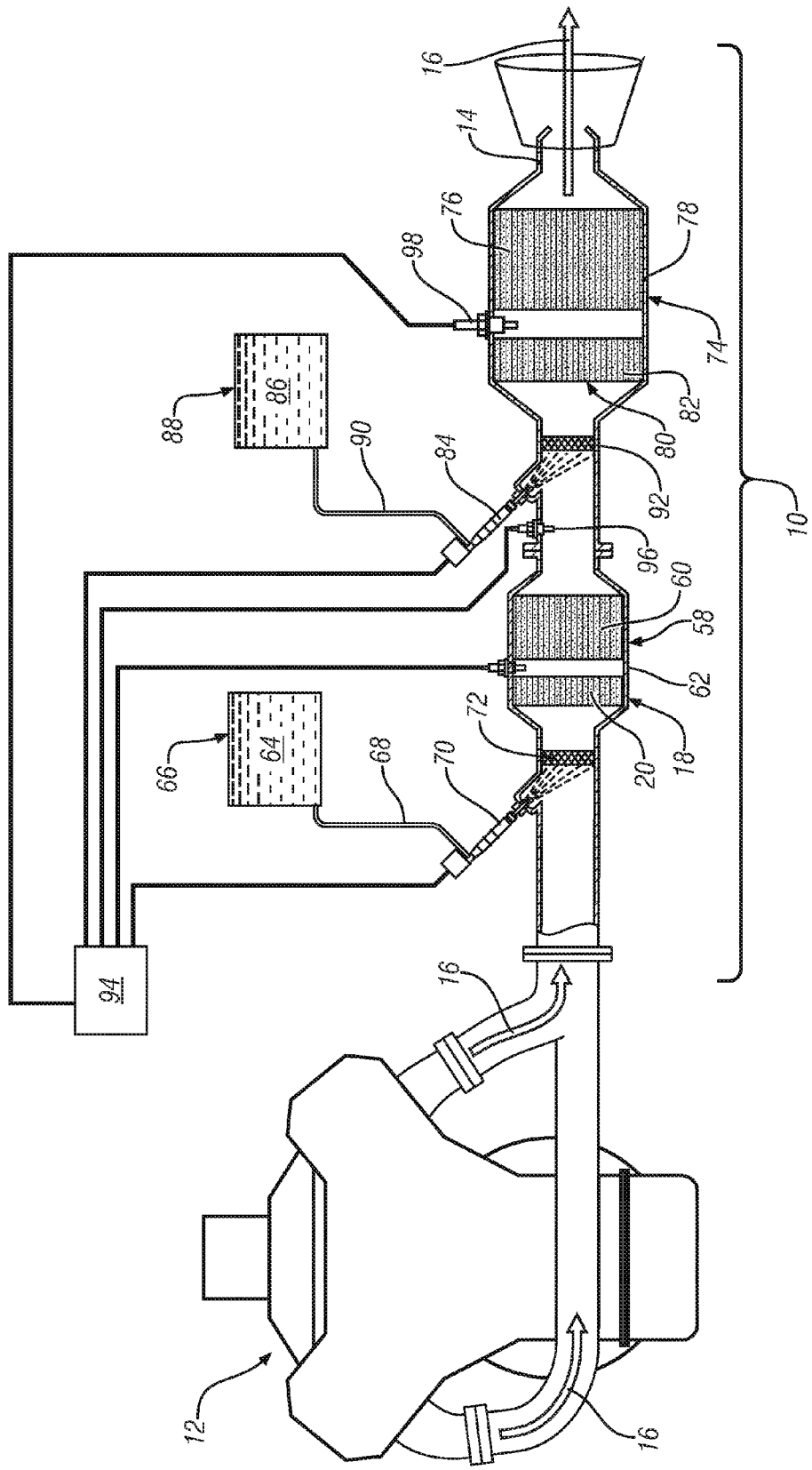
FIG. 8 is a schematic partial cross-sectional view of a second exemplary embodiment of an exhaust gas treatment system as disclosed herein.
Figure 9:
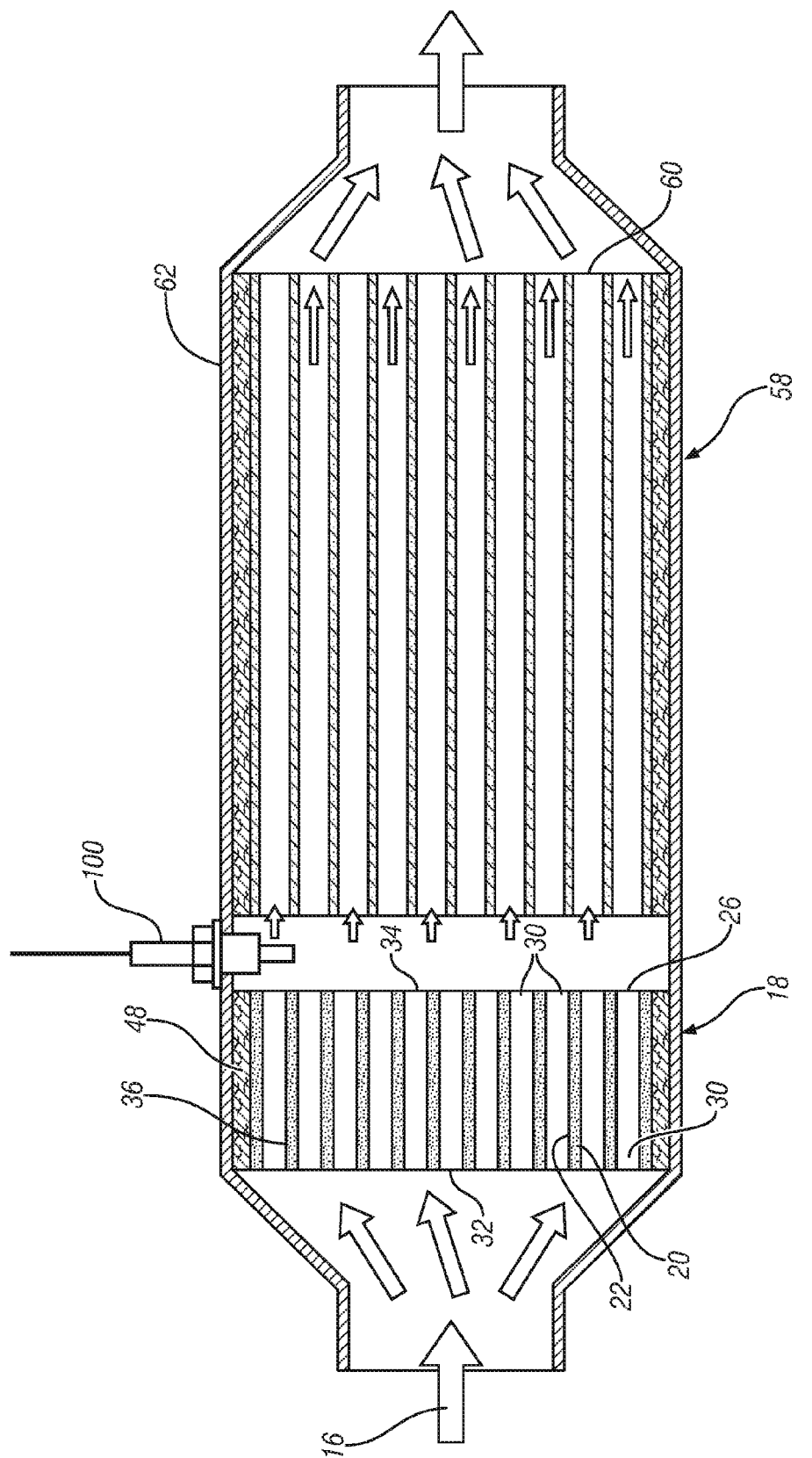
FIG. 9 is a schematic cross-sectional view of an exemplary embodiment of an ash filter and exhaust treatment device as disclosed herein.
Figure 10:
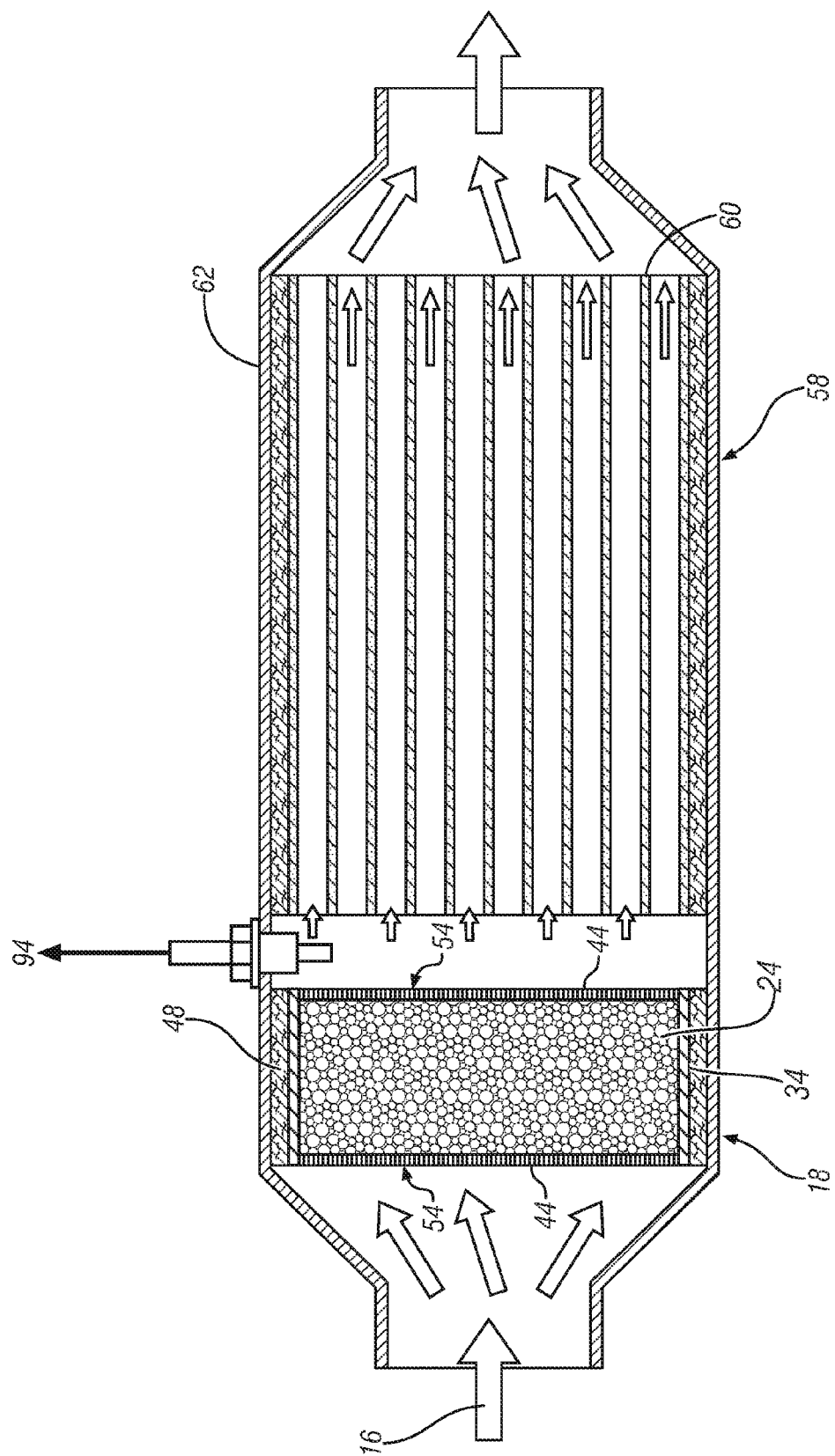
FIG. 10 is a schematic cross-sectional view of a second exemplary embodiment of an ash filter and exhaust treatment device as disclosed herein.
Figure 11:
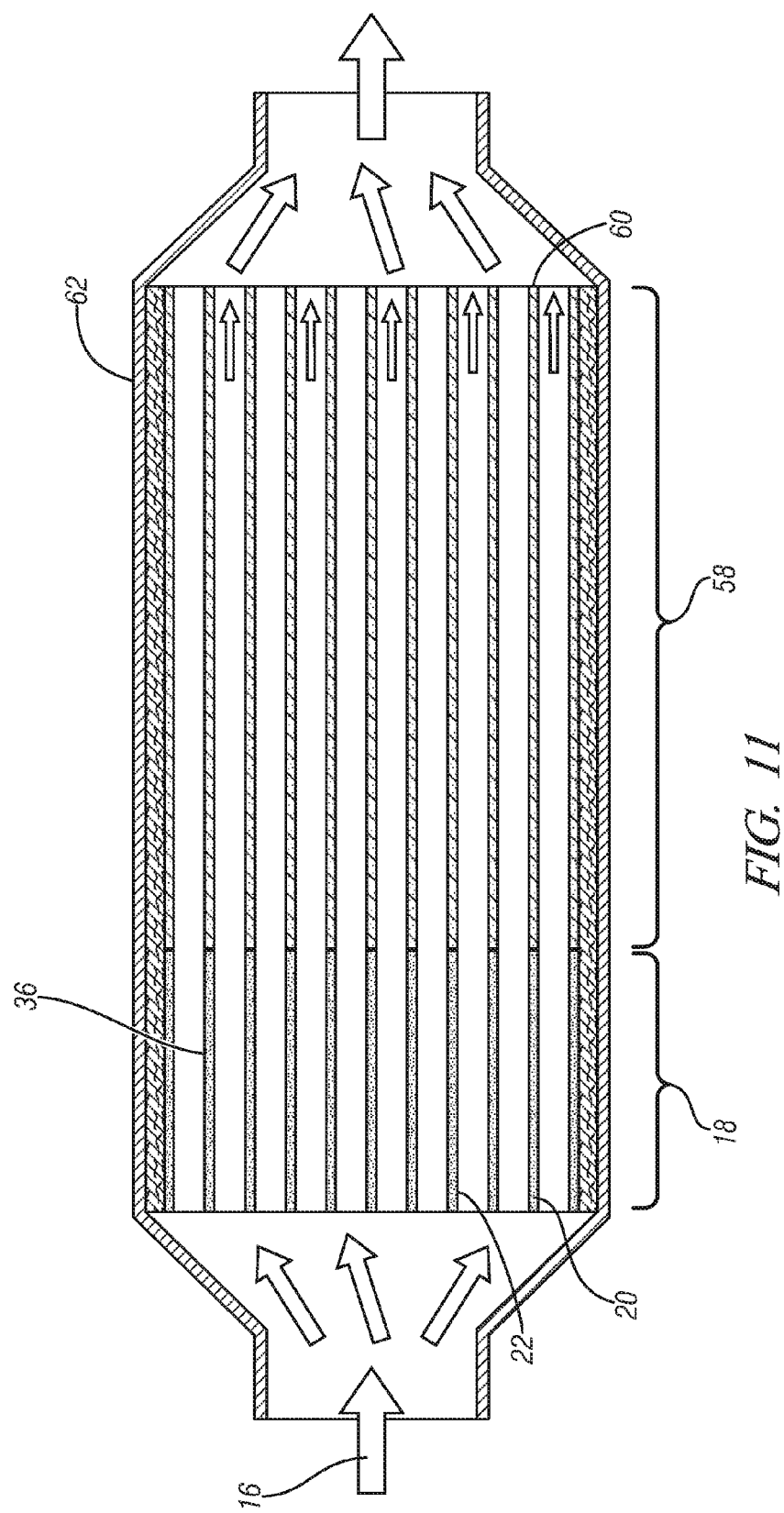
FIG. 11 is a schematic cross-sectional view of a third exemplary embodiment of an ash filter and an exhaust treatment device as disclosed herein.

A second exemplary embodiment of an exhaust treatment system 10 is illustrated in FIG. 8. System 10 of this embodiment is substantially identical to that described above with reference to FIG. 3, except that the discrete ash filter 18 is replaced with an integrated ash filter 18 (FIGS. 9 and 10) or integral ash filter 18 (FIG. 11) that is incorporated together with SCR catalyst 58. As shown in the exemplary embodiments illustrated in FIGS. 9-11, integrated or integral ash filter 18 is combined with SCR catalyst 58 in a single housing 50. Housing 50 may be modified, such as by extending housing, to accommodate incorporation of ash filter 18. May also incorporate a sensor for use in control of exhaust treatment system 10, such as a $NO_X$ sensor 100 for measuring the $NO_X$ content of exhaust gas flow 16 and providing signal input to controller 94. As shown in FIGS. 9 and 10, integrated ash filter 18 may be incorporated as a flow-through monolith 26 or as a bed 24 of particles. The construction of flow-through monolith 26 and bed 24 may be the same as described above with reference to the embodiments of FIGS. 4 and 5, and 6 and 7, respectively. In the exemplary embodiment of FIG. 11, integral ash filter 18 may be incorporated onto the flow-through monolith 60 of SCR catalyst 58 on the inlet end of SCR catalyst 58. This may be accomplished, for example, using zone coating techniques for depositing porous matrix material 22 on a portion of the flow-through monolith 60 of monolith 26, with the remainder of the monolith receiving the catalyst material as described herein with reference to SCR catalyst 58. The exemplary embodiments both integrated and integral ash filter 18 shown in FIGS. 9-11 are particularly advantageous in that they shorten the overall length of exhaust treatment system 10 and the space envelope required for this system on board the vehicle in which it is installed, including the under-hood space that contains diesel engine 12, and which is frequently space limited, i.e., the number of components that are desirable for packaging within the space exceed the available volume. These configurations are also advantageous in that they reduce the cost of components needed to package a discrete filter, such as the housing, intumescent mat and the like. Embodiment of FIG. 11 is particularly desirable in that the SCR catalyst and ash filter may be manufactured as a single component, and do not require separate sourcing, shipping and handling and manufacturing in order to be incorporated into system 10.

A third exemplary embodiment of an exhaust treatment system 10 is illustrated in FIGS. 12 and 13. System 10 of this embodiment is similar in some respects to those described above having some common elements; however, their arrangement is somewhat different, as described below. The basic arrangement includes a DOC 80 located upstream of a two-way catalyst 110. Ash filter 18 is an integral ash filter that is incorporated onto a ceramic wall-flow monolith 28 of two-way catalyst 110.

DOC 80 is shown as a discrete device, and may include a flow-through metal or ceramic monolith substrate 82 that is wrapped in an intumescent mat (not shown) that expands when heated, securing and insulating the substrate in the metal shell or canister 114. The substrate 82 has an oxidation catalyst compound (not shown) disposed thereon. The oxidation catalyst compound may be applied as a washcoat and may contain a Pt group metal catalyst material. Suitable Pt group metal catalysts include Pt, Rh, Ir, Ru, Re, Os or Pd, or an alloy of them, or a combinations thereof.

Two-way catalyst 110 includes a DPF 74 and an SCR catalyst 58, in the form of a U-SCR catalyst, housed on a single wall-flow monolith 28 structure used to house SCR catalyst 58. However, in other embodiments, SCR catalyst 58 may include other SCR devices, including an HC-SCR catalyst, LNT catalyst or NSR catalyst in place of the U-SCR catalyst. As shown in the exemplary embodiment illustrated in FIGS. 12 and 13, integral ash filter 18 is located proximate the inlet 46 on the sidewalls 44 of the inlet passages 40 of the monolith as a washcoat, as described herein. As such, it is located upstream of DPF 74 and SCR catalyst 58. The ash filter 18 washcoat may extend along a portion of inlet passages 40 as shown, or alternately, may extent along the entire length of inlet passages 40. DPF 74 includes porous sidewalls 44. In this configuration, ash filter 18 may also provide some DPF functionality and accumulate some soot or OM particles; however, the DPF 74 functionality is substantially associated with sidewalls 44. SCR catalyst 58 is located downstream of both ash filter 18 and DPF 74. A washcoat 59 that includes the SCR catalyst material used in SCR catalyst 58 is located proximate the outlets 47 on the sidewalls of the outlet passages 42. This may be accomplished, for example, using zone coating techniques for depositing porous matrix material 22 on the inlet passage portion of wall-flow monolith 28, with the remainder of the monolith receiving the washcoat 59 of catalyst material as described herein with reference to SCR catalyst 58. Ceramic wall-flow monolith 28 substrate is wrapped in an intumescent mat 116 that expands when heated, securing and insulating the substrate in the metal shell or canister 118. Housing 118 may also incorporate a sensor for use in control of exhaust treatment system 10, such as a $NO_X$ sensor 100 for measuring the $NO_X$ content of exhaust gas flow 16 and providing signal input to controller 94.

Referring again to FIGS. 12 and 13, disposed upstream of the DOC 80, in fluid communication with the exhaust gas flow 16 in the exhaust gas conduit 14, is an HC or fuel injector 84. The fuel injector 84, is in fluid communication with HC 86, such as fuel, in fuel supply tank 88 or other fuel source, such as a fuel conduit of a common rail fuel injection system (not shown), through fuel conduit 90. Fuel injector 84 is configured to introduce unburned HC 86 into the exhaust gas flow 16 for delivery to DOC 80. A mixer or turbulator 92 may also be disposed within the exhaust gas conduit 14, in close proximity to the fuel injector 84, to further assist in thorough mixing of the liquid or gaseous HC or fuel with the exhaust gas flow 16.

The $NH_3$ reductant 64, supplied from reductant supply tank 66 through conduit 68, may be injected into the exhaust gas conduit 14 at a location upstream of the SCR catalyst 58 using a urea injector 70 in fluid communication with conduit 68, or other suitable method of delivery of the reductant to the exhaust gas flow 16. The reductant may be in the form of a gas, a liquid, including an aqueous urea solution and may be mixed with air in the injector 70 to aid in the dispersion of the injected spray. A mixer or turbulator 72 may also be disposed within the exhaust gas conduit 14 in close proximity to the injector 70 to further assist in thorough mixing of the reductant 64 with the exhaust gas flow 16.

A controller such as vehicle controller 94 is operably connected to, and monitors and controls, the exhaust gas treatment system 10 through signal communication with urea injector 70, fuel injector 84 and a number of temperature, pressure and exhaust gas sensors, such as $NO_X$ sensors, oxygen sensors and the like. As used herein, the term controller may include any suitable controller, such as an application specific integrated circuit (ASIC), an electronic circuit, a processor (shared, dedicated or group) and memory that executes one or more software or firmware programs, a combinational logic circuit, and/or other suitable components that provide the described control functionality.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiments disclosed as the best mode contemplated for carrying out this invention, but that the invention will include all embodiments falling within the scope of the present application.

What is claimed is:

1. An exhaust treatment system for a reciprocating piston internal combustion engine, comprising:
    an ash filter comprising a substrate, the substrate comprising a honeycomb monolith comprising a plurality of flow-through flow channels separated by adjoining walls, wherein an exhaust gas flow through the flow channels does not flow through the adjoining walls, and a matrix of an uncatalyzed first zeolite and configured to receive an exhaust gas flow from an engine;
    an exhaust treatment device, the exhaust treatment device comprising a matrix of a second zeolite and configured to receive the exhaust gas flow from the ash filter;
    an SCR device configured to receive in operation the exhaust gas flow from the exhaust treatment device, the SCR device having an SCR catalyst; and
    a particulate filter configured to receive in operation the exhaust gas flow from the SCR device.

2. The exhaust treatment system of claim 1, wherein the exhaust treatment device comprises an oxidation catalyst.

3. The exhaust treatment system of claim 1, wherein the SCR catalyst comprises an HC-SCR catalyst, a lean $NO_x$ trap, an NSR catalyst or a U-SCR catalyst.

4. The exhaust treatment system of claim 1, wherein the first zeolite comprises NaX, NaY or ZSM-5, or a combination thereof.

5. The exhaust treatment system of claim 1, wherein the first zeolite has an average pore size greater than about 1 nm.

6. The exhaust treatment system of claim 1, wherein the first zeolite matrix is disposed on the surface of or within a substrate.

7. The exhaust treatment system of claim 1, wherein the ash filter and exhaust treatment device are both formed on a single honeycomb monolith.

8. The exhaust treatment system of claim 1, wherein the first zeolite matrix comprises alumina.

9. The exhaust treatment system of claim 8, wherein the first zeolite matrix further comprises silica.

10. The exhaust treatment system of claim 8, wherein the first zeolite matrix further comprises Zr, Nb, Y, Hf, La, Ce or Nd, or an oxide or alloy thereof, or a combination thereof.

11. The exhaust treatment system of claim 9, wherein first zeolite matrix comprises a layer disposed on a surface of the substrate.

12. The exhaust treatment system of claim 11, wherein the layer has a density of about 1.0-3.0 $g/in_3$.

13. The exhaust treatment system of claim 1, wherein the ash filter is formed on a first honeycomb monolith and the exhaust treatment device is formed on a second honeycomb monolith, the first monolith fluidly coupled to the second monolith for passage of the exhaust gas flow therebetween.

14. The exhaust treatment system of claim 13, wherein the first monolith and second monolith are disposed in a single housing.

15. A method of treating an exhaust gas flow from an internal combustion engine, comprising:
    providing an exhaust treatment system comprising:
        an ash filter comprising a matrix of an uncatalyzed first zeolite and configured to receive an exhaust gas flow from an engine; and a first exhaust treatment device, the first exhaust treatment device comprising a matrix of a second zeolite and configured to receive the exhaust gas flow from the ash filter, the ash filter comprising a substrate, the substrate comprising: 1) a honeycomb monolith comprising a plurality of flow-through flow channels separated by adjoining walls, wherein the exhaust gas flow through the flow channels does not flow through the adjoining walls, or 2) a bed of substrate particles; wherein the exhaust gas flow through the bed does not flow through the substrate particles;
        a selective catalytic reduction (SCR) device, the SCR device configured to receive the exhaust gas flow directly from the ash filter and comprising an SCR catalyst; and
        a particulate filter that is configured to receive the exhaust gas flow from the SCR device;
    operating the engine to produce the exhaust gas flow containing an amount of ash; and
    filtering the exhaust gas flow using the ash filter to reduce the amount of ash in the exhaust gas flow.

16. The method of claim 15, further comprising:
    removing the ash filter;
    providing a replacement ash filter.

17. The method of claim 16, further comprising:
    using a controller to monitor a predetermined characteristic of the exhaust treatment system associated with the amount of ash in the exhaust gas flow or an amount of ash in the ash filter, and
    predicating removing on the predetermined characteristic.

18. An exhaust treatment system for a reciprocating piston internal combustion engine, comprising:
    an ash filter, comprising:
        a substrate, the substrate comprising a bed of substrate particles; wherein an exhaust gas flow through the bed does not flow through the substrate particles, and
        a matrix of a zeolite material disposed on the substrate, the matrix of the zeolite material configured to remove ash from the exhaust gas flow;
    an SCR device, the SCR device configured to receive the exhaust gas flow directly from the ash filter and comprising an SCR catalyst; and
    a particulate filter that is configured to receive the exhaust gas flow from the SCR device.

* * * * *